United States Patent [19]

Le Deit et al.

[11] Patent Number: 5,609,228
[45] Date of Patent: Mar. 11, 1997

[54] ASSEMBLY OF A FRICTION MEMBER AND OF A SPRING FOR A DISK-BRAKE AND DISK-BRAKE EQUIPPED WITH SUCH AN ASSEMBLY

[75] Inventors: Gerard Le Deit, Courtry; Jean Louis Gerard, Bagnolet, both of France

[73] Assignee: AlliedSignal Europe Service Techniques, Drancy, France

[21] Appl. No.: 140,194

[22] PCT Filed: Oct. 29, 1993

[86] PCT No.: PCT/FR93/01067

§ 371 Date: Nov. 4, 1993

§ 102(e) Date: Nov. 4, 1993

[87] PCT Pub. No.: WO94/12803

PCT Pub. Date: Jun. 9, 1994

[30] Foreign Application Priority Data

Nov. 26, 1992 [FR] France .................................. 92 14208

[51] Int. Cl.⁶ .................... F16D 55/226; F16D 65/097
[52] U.S. Cl. .................... 188/73.35; 188/205 A
[58] Field of Search .................... 188/73.1, 72.3, 188/73.31, 73.35, 73.36, 73.37, 73.38, 73.39, 205 A

[56] References Cited

U.S. PATENT DOCUMENTS 3,403,756  10/1968  Thirion ............................ 188/205 A X
4,410,069  10/1983  Schreiner et al. ................ 188/73.38 X

FOREIGN PATENT DOCUMENTS 0002399  2/1991  European Pat. Off. .
75 33911  6/1975  France .

Primary Examiner—Josie Ballato
Attorney, Agent, or Firm—Leo H. McCormick, Jr.

[57] ABSTRACT

This invention relates to a vehicle disk-brake and spring (40) through which a friction member (10) is attached to a torque-withstanding member (24). A support plate (12) is received via its circumferential ends (16, 18), which is anchored, and slides on the torque-withstanding member (24). At least one circumferential end (18) of the support plate (12) comprises of a rounded surface (22) interacting with the anchor and sliding with the rounded surface (32) defined on the torque-withstanding member (24). One of the rounded surfaces (32) is concave, and the other rounded surface (22) is convex with the radius of curvature of the convex surface (22) being less than the radius of curvature of the concave surface (32). The friction member (10) is received with a predetermined circumferential clearance (B) in the torque-withstanding member (24) so that the friction member (10) may occupy a first and a second extreme circumferential position corresponding to the support plate (12) which is anchored onto the torque-withstanding member (24) via the first circumferential end (16), or a second circumferential end (18) respectively. The spring (40) has an action part (42) which interacts with an opening (36) made in the convex rounded part (18) and a reaction part (44,46) which interacts with edges (60,62) on the concave rounded pan (32). Thus, depending on the direction of the rotation of the disk, the spring (40) stresses the friction member (10) into the first extreme circumferential position and into permanent contact with the rounded surface (32) defined on the torque-withstanding member (24).

6 Claims, 3 Drawing Sheets

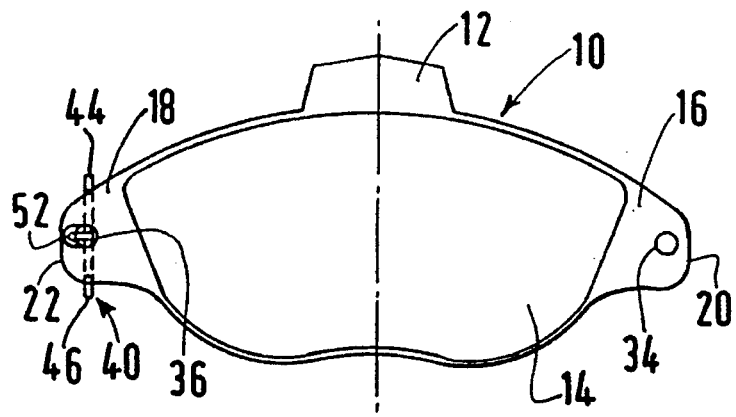
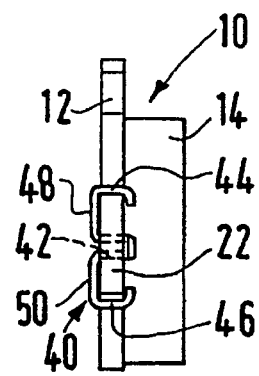
FIG.1  FIG.2
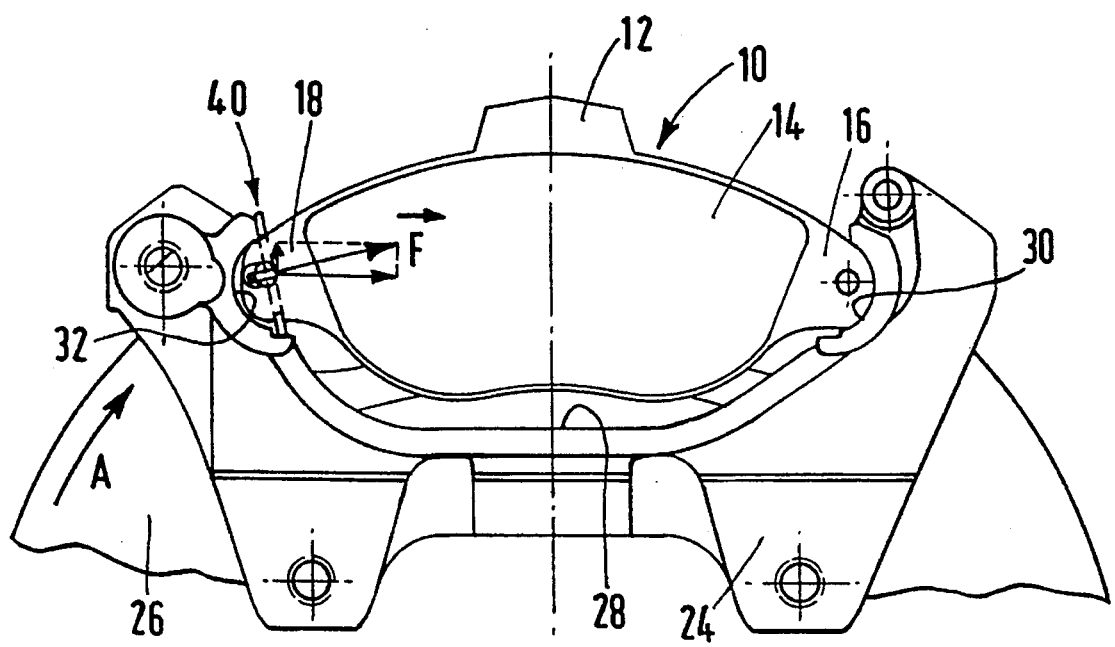
FIG.3

ASSEMBLY OF A FRICTION MEMBER AND OF A SPRING FOR A DISK-BRAKE AND DISK-BRAKE EQUIPPED WITH SUCH AN ASSEMBLY

The present invention relates to the field of disk-brakes for motor vehicles, and its subject is more particularly an assembly made up of a friction member and of a spring for equipping such disk-brakes.

BACKGROUND OF THE INVENTION

Disk-brakes have been known for a long time and conventionally comprise friction members received via their circumferential ends with anchoring and sliding on a member withstanding the braking torque, whether the latter consists of a fixed caliper, a sliding caliper or even a fixed support member, control means being associated in order to stress the friction member into braking contact with a corresponding face of the brake disk.

It is also known, for example from the document FR-A-2,330,916, to give the circumferential ends of the friction members a rounded surface capable of interacting with anchoring and sliding with a corresponding rounded surface defined on the torque-withstanding member, one of these rounded surfaces being concave and the other rounded surface being convex.

For a brake of this type, the document EP-B-0,002,399 makes provision for a friction member whose circumferential ends are received with sliding and anchoring on a torque-withstanding member, control means being associated with the latter in order to stress the friction member into braking contact with a corresponding face of a brake disk, at least a first of the circumferential ends of the friction member comprising at least one rounded surface capable of interacting with sliding and anchoring with a corresponding rounded surface defined on the torque-withstanding member, one of the rounded surfaces being concave, and the other rounded surface being convex, the radius of curvature of the convex surface being less than that of the concave surface, the friction member being received with a predetermined circumferential clearance in the torque-withstanding member, so that the friction member may occupy a first and a second extreme circumferential position corresponding to the friction member being anchored onto the torque-withstanding member via its first circumferential end or via the second circumferential end respectively, according to the direction of rotation of the disk, elastic means being provided in order to stress the friction member away from the first extreme circumferential position and into permanent contact with the rounded surface defined on the torque-withstanding member.

Such an arrangement has the object of forcing the friction member to move along an opposite surface defined on the torque-withstanding member each time the brake is actuated, so as to avoid the formation of deposits and automatically to scour the contacting rounded surfaces of the friction member and of the torque-withstanding member.

SUMMARY OF THE INVENTION

Such a solution gives complete satisfaction in normal use of the vehicle thus equipped. However, when the wheel of the vehicle associated with a brake of this type is subjected to considerable vertical accelerations due, for example, to a poor road surface, the inertia of the friction member may become greater than the stress exerted by the elastic means, and the friction member may then move within the limits of the predetermined circumferential clearance. When, under these conditions, the brake is actuated, the friction member is not in the circumferential position in which it should be and the braking action has the result of violently throwing the friction member onto the torque-withstanding member. There therefore results considerable banging, which, apart from generating intense noise, may impede the operation of the brake and detract from its durability.

The object of the present invention is therefore to provide, in a disk-brake of the type recalled above, an assembly of a friction member and of a spring which does not exhibit these drawbacks.

To this end, according to the present invention, the spring is produced from a metal wire and comprises an action part interacting with an opening made in the convex rounded part and a reaction part interacting with the edges of the concave rounded part.

By virtue of such a spring, the action part exerts, on the support plate of the friction member, a force having a tangential component and a radial component. The radial component is advantageously directed towards the outside of the disk. The tangential component is also advantageously directed in the direction of rotation of the disk corresponding to the forward travel of the vehicle.

By suitably choosing the stress exerted by the spring on the friction member, the latter will always be in its first circumferential position, regardless of the stresses to which the wheel of the vehicle associated with the brake equipped with an assembly of a friction member and of a spring according to the present invention is subjected.

BRIEF DESCRIPTION OF THE DRAWINGS

The invention will be clearly understood and other objects, features and advantages will emerge clearly from reading the description which follows of an embodiment given by way of example with reference to the appended drawings in which:

FIG. 1 is a front view of an assembly of a friction member and of a spring produced in accordance with the present invention;

FIG. 2 is a side view of the assembly represented in FIG. 1;

FIG. 3 is a front view of the assembly represented in FIG. 1 installed in a torque-withstanding member;

DETAILED DESCRIPTION OF THE INVENTION

Figure 4:
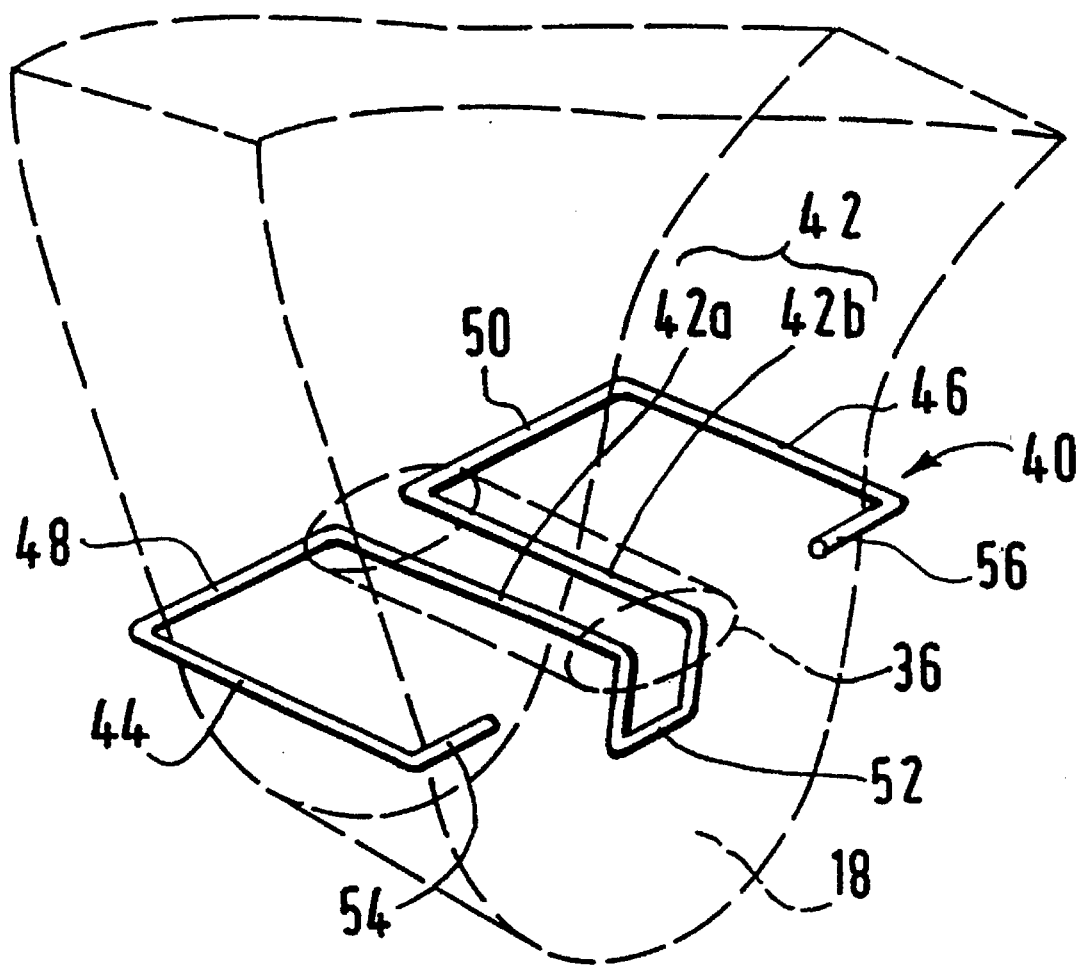
FIG. 4 is a view in perspective of the spring equipping the assembly represented in FIG. 1.

On the various figures, the same elements carry the same reference numerals.

FIG. 1 represents an assembly formed by a friction member denoted overall by the reference 10, comprising a lining support plate 12 with which there is associated, by any suitable means such as, for example, by bonding or riveting, a pad of friction material 14. The front circumferential end 16 and back circumferential end 18 of the friction member 10 comprise rounded surfaces 20 and 22 respectively and are made up of extensions of the lining support plate 12, devoid of friction material. The rounded surfaces 20 and 22 are defined on the edges of these extensions.

The friction member 10 is intended to equip a disk-brake comprising (FIG. 3) a fixed torque-withstanding member 24 provided in order to be associated with a fixed part of the vehicle. The fixed torque-withstanding member 24 has a U-shape and straddles a disk 26 provided to be associated with a part revolving with one of the wheels of the vehicle. The fixed member 24 defines, on either side of the disk 26, two windows, only one of which 28 is represented in FIG. 3, receiving, with anchoring and sliding, two friction members such as 10, arranged opposite the friction faces of the disk 26.

The fixed torque-withstanding member 24 is formed, on either side of the window 28, with front 30 and back 32 rounded surfaces, interacting with the opposite rounded surfaces 20 and 22 respectively formed on the support plate 12 of the friction member 10. The front 16 and back 18 ends correspond respectively onto the ends via which the friction member 10 is anchored onto the fixed member 24 when the disk 26 revolves in the direction corresponding to the forward travel of the vehicle indicated by the arrow A in FIG. 3. The rounded surfaces 20 and 22 are convex surfaces and the opposite rounded surfaces 30 and 32 are concave surfaces whose radius of curvature is greater than or equal to that of the convex surfaces 20 and 22, at any point, so that the friction member 10 is received with a predetermined circumferential clearance B in the torque-withstanding member 24.

Finally, a spring 40 is associated with the friction member 10 so as to stress the latter circumferentially into the torque-withstanding member 24. More precisely, at least one circumferential end of the friction member 10 is formed with a throughhole. In the example shown, openings 34 and 36 are formed in the ends 16 and 18 respectively, in order to ensure the symmetry of the friction member 10 during manufacture, between the inner friction member and the outer friction member. The spring 40 is made from metal wire, it is associated with the back circumferential end 18 and comprises an action part 42 passing through the opening 36 and a rear action part interacting with the edges of the concave rounded part 32 of the torque-withstanding member 24.

The reaction part of the spring 40 is formed by two branches 44 and 46, substantially parallel to each other and to the action part 42, and connected to the latter by two arms 48 and 50 respectively.

In the example shown in FIGS. 1 to 4 and 6, the action part 42 is itself double and is formed of two strand-parts 42a and 42b.

In other words, the spring 40 is obtained from a segment of metal wire folded in half at its middle. The metal wire part in the immediate vicinity of the fold constitutes a U-shaped connection part 52, connecting one of the ends of the two strand-parts 42a and 42b forming the action part 42, the other end of the strand-parts 42a and 42b is extended substantially at right angles by the arm 48, 50, respectively, itself extended substantially at right angles in the same plane by the branch 44, 46 of the reaction part.

Advantageously, to ensure that the spring 40 is held on the friction member 10, provision may be made for at least one of the branches 44, 46 forming the reaction part to be extended substantially at right angles in the same plane by a terminal part 54, 56 directed towards the U-shaped connection part 52. The strand-parts 42a and 42b, as well as the branches 44 and 46 having a length which is slightly greater than the thickness of the circumferential part 18 of the lining support plate 12 of the friction member 10, the arms 48 and 50 in interaction with the terminal parts 54 and 56 ensure that the spring 40 is held circumferentially on the friction member 10, whilst the action part 42 in the opening 36 ensures that it is held radially.

In addition, if it is desired to perfect the holding of the spring 40 on the friction member 10, provision may be made to curve the U-shaped connection part 52 substantially at right angles with respect to the plane containing the action part 42 and reaction part 44, 46, as well as the arms 48 and 50. The connection part 52 thus also participates in circumferentially holding the spring 40 on the friction member 10, in interaction with the arms 48 and 50.

Figure 5:
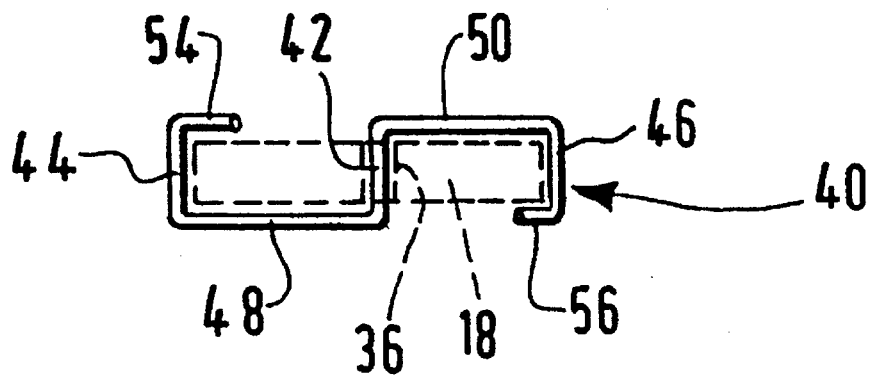
FIG. 5 is a plan view of a variant of the spring of FIG. 4.

According to another embodiment of the spring 40 represented in FIG. 5, the spring 40 is obtained from a segment of metal wire whose central part, whose length is slightly greater than the thickness of the circumferential part 18 of the lining support plate 12 of the friction member 10, makes up the action part 42 of the spring 40, passing through the opening 36 in the action part 42 and extended substantially at right angles by an arm 48, 50 itself extended substantially at right angles in the same plane via the branch 44, 46 of the reaction part of the spring 40.

Also advantageously in this embodiment, provision may be made to extend, substantially at right angles, at least one of the branches 44, 46 via a terminal part 54, 56 directed towards the action part 42 in order to ensure that the spring 40 is held on the friction member 10.

Having thus described the friction member and the accompanying spring, the operation of this assembly in a disk-brake will be easily understood. The friction member 10 equipped with its spring 40 is installed, as has been shown in FIGS. 3 and 6, on a torque-withstanding member 24 which, in the example shown is fixed, for example fixed to the stub axle holder of the wheel thus equipped. The caliper for the brake has not been shown for reasons of clarity of the drawing, only the control means has been indicated by a dotted line. There can be seen, in FIGS. 3 and 6, the inner friction member, that is to say the one located on the inboard side of the disk 26. It goes without saying, that the following explanations apply to the outer friction member, that is to say the one located on the outboard side of the disk 26.

Figure 6:
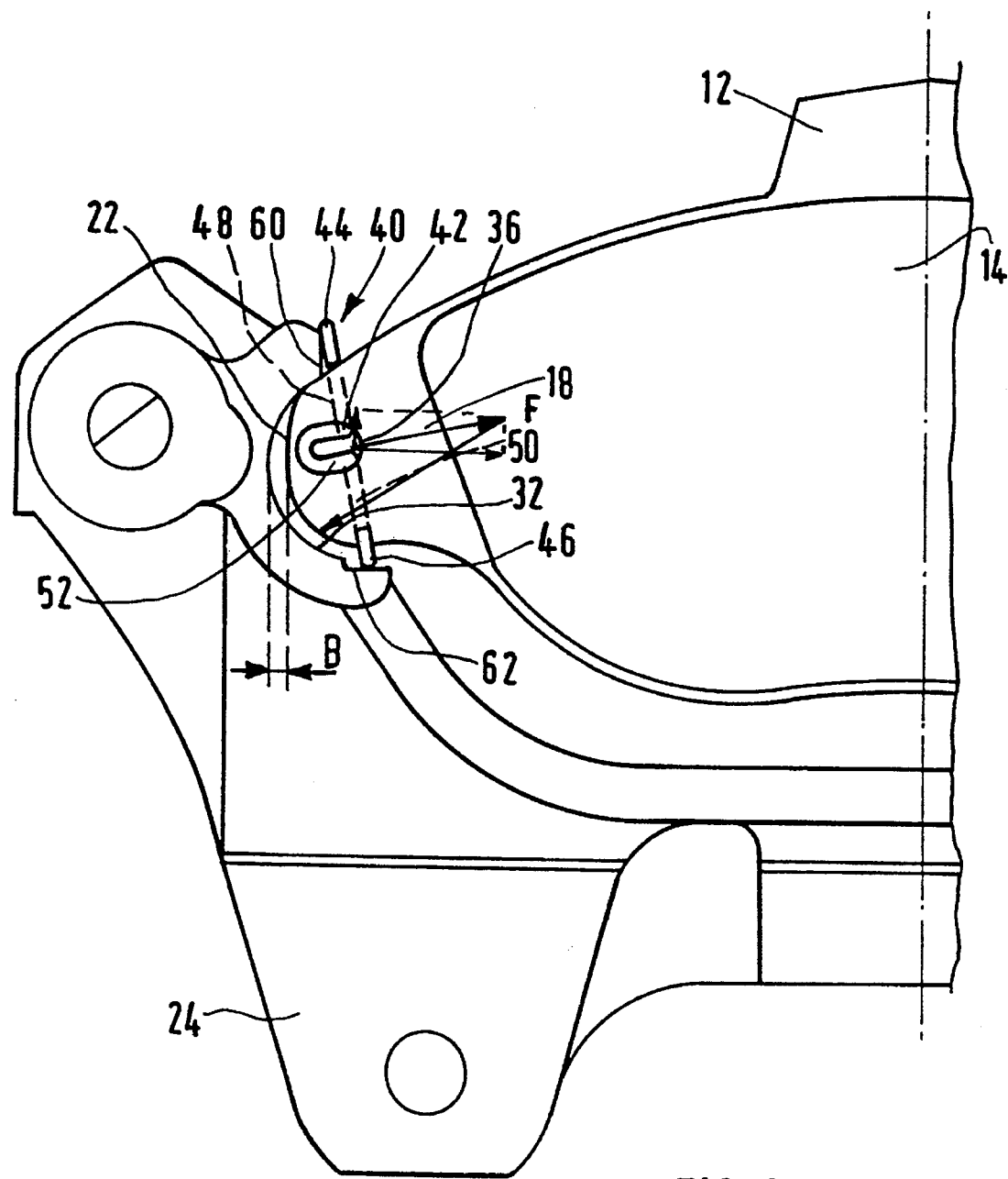
FIG. 6 is a view on a larger scale of a detail of FIG. 3.

When the friction member/spring assembly is installed on the torque-withstanding member 24 and is at rest, the various elements occupy the positions represented in FIGS. 3 and 6. In particular, the spring 40 is subjected to a prestress at rest, the reaction part made up of the branches 44 and 46 bearing on the edges of the concave rounded part 32 formed on the torque-withstanding member 24, and the action part 42 exerting a force on the wall of the opening 36 made in the convex rounded part 18 of the support plate 12. More precisely, the concave rounded part 32 of the torque-withstanding member 24 has, by construction, a limited spread and is connected to the remainder of the structure of the torque-withstanding member 24 by edges or flanks 60 and 62 (FIG. 3) on which the reaction part 44 and 46 of the spring 40 bear, the distance between the branches 44 and 46 of the reaction part being greater than the opening of the concave part 32, that is to say the chord (in the geometric sense of the term) joining the ends of the concave rounded part.

Since the spring 40 is therefore prestressed between the edges or flanks 60 and 62 of the concave rounded part 32 and the wall of the opening 36 in the convex rounded part 18, the branches 48 and 50 adopt a position in which they form, in the plane of FIG. 6, for example, an acute angle whose apex is located in the region of the action part 42.

The latter will therefore exert, on the friction member 10, by means of the wall of the opening 36, a force F directed along the bisector of this angle. This force F has a tangential component $F_T$ and a radial component $F_R$ perpendicular to each other. The radial component is directed towards the outside of the disk 26, with respect to the axis of the latter, and stresses the convex rounded surface 22 into contact with the concave rounded surface 32 at a point furthest away from the axis of the disk 26.

The tangential component is directed in the direction of rotation of the disk corresponding to the forward travel of the vehicle, indicated by the arrow A in FIG. 3, and stresses the convex rounded surface 22 away, in the circumferential direction, from the concave rounded surface 32, in order to define the circumferential clearance B. The convex rounded surface 20, at the front of the friction member 10, is therefore itself stressed into contact with the bottom of the concave rounded surface 30.

When the vehicle runs in the forward direction and the driver actuates the brake pedal, pressurized hydraulic fluid is communicated to a brake motor (not shown), which applies to the support plate 12 a force which applies the pad of friction material 14 onto a face of the disk 26. The other friction member will be applied onto the other face of the disk by reaction or by another brake motor.

The consequence of the pad of friction material 14 coming into engagement with the face of the disk 26, is, other than slowing down the rotation of the latter, to transmit to the friction member 10 a braking force directed to the right considering FIGS. 3 and 6, when the disk 26 rotates in the direction corresponding to the forward travel of the vehicle denoted by the arrow A in FIG. 3. By virtue of the specific design of the spring and of the friction member according to the invention in the torque-withstanding member, this braking force is exerted parallel to and in the same direction as the force F previously described exerted by [sic] rest by the spring on the friction member. It therefore follows that, during a braking action, the friction member 10 is stressed into the circumferential position which it already occupied prior to this braking action.

It can therefore be understood that the friction member/ spring assembly according to the invention has a rest position exactly corresponding to its operational position and that thus, the friction member will not be made to leave this position, even in the case of extreme stresses such as the considerable vertical accelerations due to a poor or even non-existent road surface.

In contrast, when the vehicle runs in the backward direction, its speed is assumed to be sufficiently low for the extreme stresses recalled above not to exist. The friction member/spring assembly therefore occupies the rest position represented in FIGS. 3 and 6. The consequence of the pad of friction material 14 coming into engagement with the face of the disk 26 is to transmit to the friction member 10 a braking force directed to the left considering FIGS. 3 and 6.

This braking force is therefore exerted counter to the circumferential component of the force exerted by the spring 40, and tends to take up the clearance B 22 and the bottom of the surface 32. During the resultant movement to the left, considering FIGS. 3 and 6, the radial component of the force exerted by the spring 40 holds the surface 22 in permanent contact with the upper part of the surface 32. Simultaneously, the surface 20 defined on the front extension 16 of the friction member 10 is stressed away from the bottom of the surface 30 defined on the torque-withstanding member 24.

In this way, each application of the brake whilst the vehicle is running in the backward direction, imposes a circumferential displacement of the friction member 10 which has the effect, following the permanent contact existing between the surfaces 32 and 22, of cleaning or scouring these surfaces. Any deposit of mud or any start of corrosion originating, from the vehicle being stationary for a long time, is therefore rapidly removed by the 10 brushing of the surfaces 32 and 22 and, likewise of the surfaces 20 and 30, each time the brake is applied whilst the vehicle is running backwards.

Of course, the invention is not limited to the embodiments which have been described by way of example, but is capable of receiving numerous modifications which will be clear to the expert.

The invention may particularly be used in any other type of brake, and in particular in a fixed brake in which the control means are associated with the torque-withstanding member and act directly on each of the friction members, as well as in a brake of the type described but in which the friction members are anchored onto the caliper. Likewise, the concave and convex opposing surfaces of the friction members and of the torque-withstanding member may be reversed, that is to say that the convex surfaces may be formed on the torque-withstanding member, the concave surfaces then being formed on the friction members. A disk-brake may also be designed in which one of the ends of the friction members would define a convex surface interacting with a concave surface formed on the torque-withstanding member, whilst the other end of the friction members would define a concave surface interacting with a convex surface defined on the torque-withstanding member. Furthermore, the radii of curvature of the concave and convex surfaces formed on the friction members and on the torque-withstanding member may be variable and different depending on whether they relate to the front end or to the back end of the friction members.

We claim:

1. A disk-brake for a vehicle, comprising at least one friction member having a support plate whose circumferential ends are received with sliding and anchoring on a torque-withstanding member, control means being associated with the torque-withstanding member in order to stress the friction member into braking contact with a corresponding face of a brake disk, at least a first of circumferential ends of the friction member comprising at least one rounded surface capable of interacting in sliding and anchoring manner with a corresponding rounded surface defined on said torque-withstanding member, one of said rounded surfaces being concave and the other rounded surface being convex, the radius of curvature of the convex rounded surface being less than that of the concave surface, the friction member received with a predetermined circumferential clearance in the torque-withstanding member so that the friction member may occupy first and second extreme circumferential positions corresponding to said friction member being anchored onto the torque-withstanding member by one of said first and second circumferential ends, respectively, according to the direction of rotation of said brake disk, a spring being provided to stress said friction member into said first extreme circumferential position and into contact with said rounded surface defined on the torque-withstanding member, said spring comprising an action part interacting with the first circumferential end and a reaction part interacting with the concave rounded surface, characterized in that said reaction part interacts with flanks of the concave rounded surface and said action part of the spring interacts with an opening made in the first circumferential end and exerts, on the support plate of the friction member, a force having a tangential component and a radial component perpendicular to the tangential component and directed toward the outside of the disk, said tangential component of said force being exerted by the spring being directed in the direction of rotation of the disk corresponding to the forward travel of the vehicle.

2. The disk brake according to claim 1, characterized in that the spring is made from metal wire, the action part of the spring having a central branch passing through the opening made in the first circumferential end, and the reaction part having two branches which are substantially parallel and symmetrical with respect to the central branch and surrounding the first circumferential end.

3. The disk brake according to claim 2, characterized in that each end of the central branch making up the action part of the spring is extended substantially at right angles by an arm extended substantially at right angles by a branch forming said reaction part which is extended substantially at right angles by a terminal part directed toward the central branch.

4. The disk brake according to claim 1, characterized in that the spring is formed from a continuous segment of metal wire bent back at a middle portion in order to form the action part which includes two parallel strand-parts penetrating into the opening made in the first circumferential end, the two strand-parts each connected at one end by a U-shaped connection part and the other end of each strand-part being extended substantially at right angles by an arm that is extended substantially at right angles by a branch forming a reaction part.

5. The disk brake according to claim 4, characterized in that at least one branch forming a reaction part is extended substantially at right angles by a terminal part directed toward the U-shaped connection part.

6. The disk brake according to claim 5, characterized in that the action part and the reaction part are substantially in the same plane, the U-shaped connection part extending substantially perpendicularly to the plane.

* * * * *